(12) United States Patent
Centner et al.

(10) Patent No.: US 6,511,744 B2
(45) Date of Patent: Jan. 28, 2003

(54) PRESSURE SENSITIVE ADHESIVES

(75) Inventors: Alexander Centner, Rödersheim-Gronau (DE); David Christie, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/783,570

(22) Filed: Feb. 15, 2001

(65) Prior Publication Data

US 2001/0028959 A1 Oct. 11, 2001

(30) Foreign Application Priority Data

Feb. 19, 2000 (DE) .......................... 100 07 692

(51) Int. Cl.$^7$ .............................. B32B 15/04
(52) U.S. Cl. ............... 428/355 EN; 428/343; 428/352; 428/355 R; 428/355 AC
(58) Field of Search ............... 428/343, 352, 428/355 R, 355 EN, 355 AC

(56) References Cited

U.S. PATENT DOCUMENTS

| | | | | |
|---|---|---|---|---|
| 4,843,134 A | * | 6/1989 | Kotnour et al. | 526/318.4 |
| 5,674,561 A | * | 10/1997 | Dietz et al. | 427/208.4 |
| 5,853,750 A | * | 12/1998 | Dietz et al. | 424/448 |
| 6,177,540 B1 | * | 1/2001 | Harlan et al. | 156/272.2 |

FOREIGN PATENT DOCUMENTS

| | | |
|---|---|---|
| DE | 195 28 369 | 2/1996 |
| WO | WO 92/15628 | 9/1992 |
| WO | WO 95/04767 | 2/1995 |
| WO | WO 95/32228 | 11/1995 |
| WO | WO 95/32229 | 11/1995 |
| WO | WO 95/32255 | 11/1995 |

OTHER PUBLICATIONS

Ullmann's Encyclopedia of Industrial Chemistry, vol. A1, pp. 221, and 233–243.
Kirk–Othmer, Encyclopedia of Chemical Technology, vol. 1, Fourth Edition, pp. 452–461.
J.P.A. Heuts, et al., Macromolecules, vol. 32, No. 12, pp. 3907–3912, "The Effects of Ester Chain Length and Temperature on the Catalytic Chain Transfer Polymerization of Methacrylates", 1999.

* cited by examiner

*Primary Examiner*—James J. Seidleck
*Assistant Examiner*—Travis B Ribar
(74) *Attorney, Agent, or Firm*—Oblon, Spivak, McClelland, Maier & Neustadt, P.C.

(57) ABSTRACT

A pressure sensitive adhesive is based on a polymer having a glass transition temperature $\leq 10°$ C. and obtained by free-radically initiated polymerization of ethylenically unsaturated monomers in a liquid medium in the presence of >0 and $\leq 5\%$ by weight, based on the overall amount of the ethylenically unsaturated monomers used for the polymerization, of at least one oligomeric compound itself obtained by free-radically initiated polymerization of ethylenically unsaturated monomers.

18 Claims, No Drawings

PRESSURE SENSITIVE ADHESIVES

The invention relates to pressure sensitive adhesives based on a polymer having a glass transition temperature ($T_g$) $\leq 10°$ C. and obtained by free-radically initiated polymerization of ethylenically unsaturated monomers in a liquid medium in the presence of >0 and $\leq 5$ parts by weight, based on 100 parts by weight of the ethylenically unsaturated monomers used for the polymerization, of at least one oligomeric compound itself obtained by free-radically initiated polymerization of ethylenically unsaturated monomers and having
a) an ethylenically unsaturated double bond content of at least 50 mol % and
b) a number-average molecular weight of from 500 to 50,000 g/mol.

Pressure sensitive adhesives (PSAs) form a permanently tacky film which adheres to a very wide variety of surfaces even—as the name of the adhesives suggests—under slight pressure at room temperature. Pressure sensitive adhesives are used to produce self-adhesive products such as self-adhesive tapes, labels, and films. Products of this kind are very easy to use and make it possible to work rapidly when bonding. In contrast to contact adhesive compositions, no ventilation times are necessary. Moreover, there is no "open time" within which the adhesive bond must be made. The quality of a self-adhesive article depends essentially on whether the cohesion (internal strength of the film of adhesive) and its adhesion (to the surface that is to be bonded) are in tune with one another in accordance with the application.

In the case of pressure sensitive adhesives for tapes and labels, in particular, the level of cohesion must be sufficient to prevent stringing and glue emergence at the edges when stamping and cutting, since otherwise the cutting tools become soiled and the cut faces sticky. At the same time, the adhesion should be at a high level in order to provide good sticking on the substrates that are to bonded.

In general, it is impossible to optimize adhesion and cohesion independently of one another. What are desired are measures which either raise the level of both properties or maintain one property unchanged while improving the other.

Polymers obtained by free-radically initiated polymerization of ethylenically unsaturated monomers in the presence of an ethylenically unsaturated oligomeric compound itself obtained by free-radically initiated polymerization of ethylenically unsaturated monomers are described in the prior art. They are used, for example, as nontacky binders in photosensitive formulations (WO 92/15628), in water-based paints (WO 95/32228, WO 95/32229, and WO 95/32255), or in highly pigmented coating formulations (U.S. Pat. No. 5,412,039).

WO 95/04767 discloses aqueous polymer dispersions obtained by free-radically initiated aqueous emulsion polymerizations of ethylenically unsaturated monomers in the presence of an oligomeric compound itself obtained by free-radically initiated polymerization of ethylenically unsaturated monomers in the presence of a transition metal compound as molecular weight regulator. It makes the general proposal to use these aqueous polymer dispersions, blended with various auxiliaries, as components in binders, polishes, inks, varnishes, paints, sealing compounds, and adhesives.

Adhesives, especially hot-melt adhesives based on a polymer prepared in the presence of an oligomeric propene compound, are disclosed in DE-A 19528369. However, the oligomeric propene derivatives used in that case are obtained by nonfree-radical, metallocene-catalyzed oligomerization of propene.

It is an object of the present invention to provide new pressure sensitive adhesives possessing good adhesion and giving bonds possessing high cohesion.

We have found that this object is achieved by pressure sensitive adhesives based on a polymer having a glass transition temperature $\leq 10°$ C. and obtained by free-radically initiated polymerization of ethylenically unsaturated monomers in a liquid medium in the presence of >0 and $\leq 5$ parts by weight, based on 100 parts by weight of the ethylenically unsaturated monomers used for the polymerization, of at least one oligomeric compound itself obtained by free-radically initiated polymerization of ethylenically unsaturated monomers and having
a) an ethylenically unsaturated double bond content of at least 50 mol % and
b) a number-average molecular weight of from 500 to 50,000 g/mol.

Oligomeric compounds obtained by free-radically initiated polymerization of ethylenically unsaturated monomers and having an ethylenically unsaturated double bond content of at least 50 mol % and a number-average molecular weight of from 500 to 50,000 g/mol are much described in the prior art. Reference may be made in this context to the documents WO 87/03605, WO 92/15628, WO 95/04767, WO 95/17435, WO 95/25765, WO 95/27737, WO 95/32228, WO 95/32229, WO 95/32255, WO 96/13527, WO 96/33224, WO 97/31030, WO 97/34934, WO 91/35541, WO 98/04603, WO 98/50436, EP-B 199436, EP-B 196783, EP-B 681601, EP-B 714416, U.S. Pat. No. 4,526,945, U.S. Pat. No. 4,694,054, U.S. Pat. No. 5,412,039, U.S. Pat. No. 5,726,263 and JP-A 9132610, and also Schrauzer and Windgassen, J. Am. Chem. Soc. 1966 (88), 3738 to 3743, Tovrog et al., J. Am. Chem. Soc. 1976 (98), 5144 to 5153, Kukulj et al., Macromolecules 1997 (30), 7661 to 7666, Kukulj et al., Macromolecules 1998 (31), 6034 to 6041, Heuts et al., Macromolecules 1999 (32), 2511 to 2519, and Heuts et al., Macromolecules 1999 (32), 3907 to 3912. In accordance with the invention, oligomeric compounds prepared by bulk, solution, emulsion, or suspension polymerization may be used.

As molecular weight regulators in oligomer preparation it is common to use transition metal compounds whose metal ion is able to exist reversibly in at least two oxidation states. The metal ion is advantageously selected from the group consisting of $Fe^{2+}$, $Fe^{3+}$, $Ru^{2+}$, $Ru^{3+}$, $Cr^{2+}$, $Cr^{3+}$, $Mo^{2+}$, $Mo^{3+}$, $W^{2+}$, $W^{3+}$, $Co^{2+}$, $Co^{3+}$, $Re^{2+}$, $Re^{3+}$, $V^{2+}$, $V^{3+}$, $Mn^{2+}$, $Mn^{3+}$, $Zr^{2+}$, $Zr^{3+}$, $Zr^{4+}$, $Ti^{2+}$, $Ti^{3+}$, $Ti^{4+}$, $Ce^{2+}$, and $Ce^{3+}$. Often, the metal ion is selected from the group consisting of $Fe^{2+}$, $Fe^{3+}$, $Co^{2+}$, $Co^{3+}$, $Cr^{2+}$, and $Cr^{3+}$. Preference is given to the use of organocobalt compounds.

To prepare the oligomeric compounds by free-radically initiated polymerization it is possible in principle to use all ethylenically unsaturated monomers which enter into free-radically initiated polymerization. In particular, these are monomers which are free-radically polymerizable in a simple manner, such as, for example, ethylene, vinyl halides, such as vinyl chloride or vinylidene chloride, vinylaromatic monomers, such as styrene, α-methylstyrene, o-chlorostyrene or vinyltoluenes, esters of vinyl alcohol and monocarboxylic acids having 1 to 18 carbon atoms, such as vinyl acetate, vinyl propionate, vinyl n-butyrate, vinyl laurate and vinyl stearate, esters of preferably $C_3$ to $C_6$ α,β-monoethylenically unsaturated mono- and dicarboxylic acids, such as especially acrylic acid, methacrylic acid, maleic acid, fumaric acid, and itaconic acid, with generally $C_1$ to $C_{12}$, preferably $C_1$ to $C_8$, and in particular $C_1$ to $C_4$ alkanols, such as especially methyl, ethyl, n-butyl, isobutyl and 2-ethylhexyl acrylate and methacrylate, dimethyl maleate and di-n-butyl maleate, nitriles of α,β-monoethylenically unsaturated carboxylic acids, such as acrylonitrile, and also $C_{4-8}$ conjugated dienes, such as 1,3-butadiene and isoprene. Generally, these monomers are of only moderate to low solubility in water under standard conditions (25° C., 1 bar).

Monomers of heightened solubility in water under the abovementioned conditions are, for example, α,β-monoethylenically unsaturated $C_3$ to $C_5$ monocarboxylic and $C_4$ to $C_8$ dicarboxylic acids, their water-soluble salts and their amides, such as acrylic acid, methacrylic acid, maleic acid, fumaric acid, itaconic acid and their alkali metal salts and ammonium salts, acrylamide and methacrylamide, vinylsulfonic acid, 2-acrylamido-2-methylpropanesulfonic acid, styrenesulfonic acid and their water-soluble salts, and N-vinylpyrrolidone. The abovementioned water-soluble or poorly water-soluble ethylenically unsaturated monomers generally form the principal monomers, which, based on the overall amount of the monomers to be polymerized, account for a proportion of ≧90% by weight, often ≧95% by weight.

Monomers which normally increase the internal strength of the films formed from the polymers of the invention usually have at least one epoxy, hydroxyl, N-methylol or carbonyl group or at least two nonconjugated ethylenically unsaturated double bonds. Examples thereof are N-alkylolamides of α,β-monoethylenically unsaturated carboxylic acids having 3 to 10 carbon atoms, among which very particular preference is given to N-methylolacrylamide and N-methylolmethacrylamide, and their esters with alkanols having 1 to 4 carbon atoms. Also suitable, in addition, are monomers having two vinyl radicals, monomers having two vinylidene radicals, and monomers having two alkenyl radicals. Particularly advantageous in this context are the diesters of dihydric alcohols with α,β-monoethylenically unsaturated monocarboxylic acids among which acrylic and methacrylic acid are preferred. Examples of such monomers having two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylates, and also divinylbenzene, vinyl methacrylate, vinyl acrylate, allyl methacrylate, allyl acrylate, diallyl maleate, diallyl fumarate, methylenebisacrylamide, cyclopentadienyl acrylate, and triallyl cyanurate. Also of particular importance in this context are the methacrylic and acrylic $C_1$–$C_8$ hydroxyalkyl esters, such as n-hydroxyethyl, n-hydroxypropyl or n-hydroxybutyl acrylate and methacrylate, and also compounds such as diacetoneacrylamide and acetylacetoxyethyl acrylate and methacrylate. The abovementioned monomers are incorporated by copolymerization usually in amounts of up to 10% by weight, often of up to 5% by weight, based in each case on the overall amount of the monomers to be polymerized.

It is essential to the invention that the oligomeric compounds have an ethylenically unsaturated double bond content of at least 50 mol %. In particular it is possible to use those oligomeric compounds whose ethylenically unsaturated double bond content is ≧60 mol %, ≧70 mol %, ≧80 mol %, or ≧90 mol %. Particularly advantageous oligomeric compounds are those whose ethylenically unsaturated double bonds are in the form of vinylidene groups of the formula

$>C=CH_2$.

Analytical determination of the ethylenically unsaturated double bonds is familiar to the skilled worker and is done, for example, by means of NMR spectroscopy.

Advantageous oligomeric compounds in accordance with the invention are those containing acid groups. Particularly advantageous oligomeric compounds are those composed in copolymerized form of ≧50% by weight, ≧60% by weight, ≧70% by weight, ≧80% by weight, ≧90% by weight or 100% by weight, and all values in between, of ethylenically unsaturated monomers containing acid groups. Particularly suitable ethylenically unsaturated monomers containing acid groups are α,β-monoethylenically unsaturated $C_3$ to $C_5$ monocarboxylic and $C_4$ to $C_8$ dicarboxylic acids and their water-soluble salts, such as acrylic acid, methacrylic acid, maleic acid, fumaric acid, itaconic acid and their alkali metal salts and ammonium salts, vinylsulfonic acid, 2-acrylamido-2-methylpropanesulfonic acid, styrenesulfonic acid and their water-soluble salts. Especially suitable monomers containing acid groups are methacrylic acid and its water-soluble salts.

The oligomeric compounds used in preparing the polymer have a number-average molecular weight of from 500 to 50,000 g/mol. Advantageously, the oligomeric compounds have a number-average molecular weight of from 1000 to 30,000 g/mol, in particular from 1500 to 20,000 g/mol, and, with particular advantage, from 2000 to 10,000 g/mol. The oligomeric compounds generally have a polydispersity index (D), corresponding to the ratio of weight-average molecular weight ($M_w$) to number-average molecular weight ($M_n$) [$D=M_w/M_n$], of ≦5. Often, D is ≦4, ≦3 or even ≦2. The determination of the number-average and weight-average molecular weights is familiar to the skilled worker and is done, for example, by means of gel permeation chromatography.

The polymer is prepared by free-radically initiated polymerization of at least one ethylenically unsaturated monomer in a liquid medium in the presence of >0 and ≦5 parts by weight, based on 100 parts by weight of the ethylenically unsaturated monomers used for the polymerization, of at least one of the above-described oligomeric compounds.

The implementation of free-radically initiated polymerizations of ethylenically unsaturated monomers in a liquid medium has been much described to date and is therefore sufficiently well known to the skilled worker [cf. in this respect Suspension polymerization in Encyclopedia of Polymer Science and Engineering, Vol. 16, John Wiley & Sons, Inc., pages 443 ff. (1989); High Polymers, Vol. X, Polymer Processes, Interscience Publishers, Inc., pages 69 ff. (1956); High Polymers, Vol. XXIX, Polymerization Processes, John Wiley & Sons, Inc., pages 106 ff. (1977); Ullmanns Encyclopädie der technischen Chemie, 4th edition, Vol. 19, VCH, Weinheim, pages 125 ff. (1980); Emulsion polymerization in Encyclopedia of Polymer Science and Engineering, Vol. 8, John Wiley & Sons, Inc., pages 659 ff. (1987); D. C. Blackley, in High Polymer Latices, Vol. 1, pages 35 ff. (1966); H. Warson, The Applications of Synthetic Resin Emulsions, Chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer [Dispersions of synthetic high polymers], F. Hölscher, Springer-Verlag, Berlin (1969), Solution polymerization in Encyclopedia of Polymer Science and Engineering, Vol. 15, John Wiley & Sons, Inc., pages 402 ff. (1989); High Polymers, Vol. X, Polymer Processes, Interscience Publishers, Inc., pages 175 ff.

(1956); High Polymers, Vol. XXIX, Polymerization Processes, John Wiley & Sons, Inc., pages 198 ff. (1977); Ullmanns Encyclopädie der technischen Chemie, 4th edition, Vol. 19, VCH, Weinheim, pages 112 ff. (1980), and Bulk polymerization in Encyclopedia of Polymer Science and Engineering, Vol. 2, John Wiley & Sons, Inc., pages 500 ff. (1985); High Polymers, Vol. X, Polymer Processes, Interscience Publishers, Inc., pages 31 ff. (1956); High Polymers, Vol. XXIX, Polymerization Processes, John Wiley & Sons, Inc., pages 88 ff. (1977)]. The polymerization reactions are normally done by distributing the at least one ethylenically unsaturated monomer, with or without the use of dispersants, homogeneously or dispersely in the liquid medium and polymerizing this system by means of a free-radical polymerization initiator. The process for preparing the polymer used in accordance with the invention differs from this procedure only in the additional presence of >0 and ≦5 parts by weight of at least one of the above-described oligomeric compounds. The polymerization frequently takes place in the presence of from 0.02 to 3 parts by weight, often from 0.05 to 2 parts by weight, or from 0.07 to 1.5 parts by weight, based in each case on 100 parts by weight of the ethylenically unsaturated monomers used for the polymerization, of at least one such oligomeric compound. It is possible to include the totality of the oligomeric compound in the initial charge to the polymerization vessel. An alternative option is to include none, or only a portion, of the oligomeric compound in the initial charge and to add it all, or the remaining portion, continuously or discontinuously, in the course of the polymerization.

Ethylenically unsaturated monomers suitable for preparing the polymer include, in particular, monomers which are free-radically polymerizable in a simple manner, such as, for example, ethylene, vinyl halides, such as vinyl chloride or vinylidene chloride, vinylaromatic monomers, such as styrene, α-methylstyrene, o-chlorostyrene or vinyltoluenes, esters of vinyl alcohol and monocarboxylic acids having 1 to 18 carbon atoms, such as vinyl acetate, vinyl propionate, vinyl n-butyrate, vinyl laurate and vinyl stearate, esters of preferably $C_3$ to $C_6$ α,β-monoethylenically unsaturated mono- and dicarboxylic acids, such as especially acrylic acid, methacrylic acid, maleic acid, fumaric acid, and itaconic acid, with generally $C_1$ to $C_{12}$, preferably $C_1$ to $C_8$, and in particular $C_1$ to $C_4$ alkanols, such as especially methyl, ethyl, n-butyl, isobutyl and 2-ethylhexyl acrylate and methacrylate, dimethyl maleate and di-n-butyl maleate, nitrites of α,β-monoethylenically unsaturated carboxylic acids, such as acrylonitrile, and also $C_{4-8}$ conjugated dienes, such as 1,3-butadiene and isoprene. Generally, these monomers are of only moderate to low solubility in water under standard conditions (25° C., 1 bar).

Monomers of heightened solubility in water under the abovementioned conditions are, for example, α,β-monoethylenically unsaturated $C_3$ to $C_5$ monocarboxylic and $C_4$ to $C_8$ dicarboxylic acids, their water-soluble salts and their amides, such as acrylic acid, methacrylic acid, maleic acid, fumaric acid, itaconic acid and their alkali metal salts and ammonium salts, acrylamide and methacrylamide, vinylsulfonic acid, 2-acrylamido-2-methylpropanesulfonic acid, styrenesulfonic acid and their water-soluble salts, and N-vinylpyrrolidone. The abovementioned water-soluble or poorly water-soluble ethylenically unsaturated monomers generally form the principal monomers, which, based on the overall amount of the monomers to be polymerized, account for a proportion of ≧90% by weight, often ≧95% by weight.

Monomers which normally increase the internal strength of the films formed from the polymers of the invention usually have at least one epoxy, hydroxyl, N-methylol or carbonyl group or at least two nonconjugated ethylenically unsaturated double bonds. Examples thereof are N-alkylolamides of α,β-monoethylenically unsaturated carboxylic acids having 3 to 10 carbon atoms, among which very particular preference is given to N-methylolacrylamide and N-methylolmethacrylamide, and their esters with alkanols having 1 to 4 carbon atoms. Also suitable, in addition, are monomers having two vinyl radicals, monomers having two vinylidene radicals, and monomers having two alkenyl radicals. Particularly advantageous in this context are the diesters of dihydric alcohols with α,β-monoethylenically unsaturated monocarboxylic acids among which acrylic and methacrylic acid are preferred. Examples of such monomers having two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylates, and also divinylbenzene, vinyl methacrylate, vinyl acrylate, allyl methacrylate, allyl acrylate, diallyl maleate, diallyl fumarate, methylenebisacrylamide, cyclopentadienyl acrylate, and triallyl cyanurate. Also of particular importance in this context are the methacrylic and acrylic $C_1-C_8$ hydroxyalkyl esters, such as n-hydroxyethyl, n-hydroxypropyl or n-hydroxybutyl acrylate and methacrylate, and also compounds such as diacetoneacrylamide and acetylacetoxyethyl acrylate and methacrylate. The abovementioned monomers are incorporated by copolymerization usually in amounts of up to 10% by weight, often of up to 5% by weight, based in each case on the overall amount of the monomers to be polymerized.

In connection with the preparation of the polymer, it is possible to include the totality of the at least one ethylenically unsaturated monomer in the initial charge to the polymerization vessel. An alternative option is to include none, or only a portion, of the at least one ethylenically unsaturated monomer in the initial charge and to add it all, or the remaining portion, continuously or discontinuously, in the course of the polymerization.

The liquid medium may be a solvent or dispersant. Suitable solvents for a solution polymerization are water, aliphatic and aromatic hydrocarbons, such as n-hexane, cyclohexane, benzene, toluene, ethylbenzene, diethylbenzene, isopropylbenzene, and diisopropylbenzene, alcohols, such as methanol, ethanol, n-propanol, 2-propanol, n-butanol, and 2-butanol, ketones, such as acetone and 2-butanone, aliphatic esters, such as ethyl acetate, halogenated hydrocarbons, such as chlorobenzene, dichloromethane, chloroform, and carbon tetrachloride, and also other organic solvent or suitable mixtures of the abovementioned liquid media. Dispersion media suitable for an emulsion and suspension polymerization include water, and for inverted emulsion polymerization include aliphatic and aromatic hydrocarbons, such as n-hexane, cyclohexane, benzene, toluene, ethylbenzene, diethylbenzene, isopropylbenzene, and diisopropylbenzene. It is also possible, however, for the monomers to be polymerized to act as solvents themselves. This is the case with bulk polymerization.

It is possible to include the totality of the liquid medium in the initial charge to the polymerization vessel. An alternative option is to include none, or only a portion, of the liquid medium in the initial charge and to add it all, or the remaining portion, continuously or discontinuously, in the course of the polymerization.

The proportion of the monomers in the system to be polymerized, consisting of monomers and liquid medium, may be from 0.1 to 100% by weight, normally ≧5 to 80% by weight, often from 20 to 70% by weight, and frequently from 40 to 60% by weight.

Suitable free-radical polymerization initiators for preparing the polymers are all those capable of triggering a free-radical polymerization in the liquid medium. They may in principle comprise peroxides and azo compounds. Also suitable, of course, are redox initiator systems. In order to conduct the free-radical polymerization in a particularly efficient manner in respect both of the desired properties and of high economy, preference is generally given in emulsion polymerization to what are known as water-soluble polymerization initiators, in suspension polymerization to what are known as water-soluble and what are known as oil-soluble polymerization initiators, and in solution and also bulk polymerization to what are known as oil-soluble polymerization initiators. The amount of the free-radical polymerization initiator used, based on the overall amount of the monomers to be polymerized, is preferably from 0.1 to 5% by weight.

The manner in which the free-radical polymerization initiator is supplied to the polymerization vessel in the course of the polymerization process is of minor importance. The free-radical polymerization initiator may either be included entirely in the initial charge to the polymerization vessel or else added continuously or in stages at the rate at which it is consumed in the course of the free-radical polymerization process of the invention. In each individual case this would depend, in a manner known to the skilled worker, on factors including the chemical nature of the at least one polymerization initiator, the monomer system to be polymerized, the liquid medium, and the polymerization temperature.

To prepare the polymer, the entire range from 0 to 200° C. is suitable as the reaction temperature, although it is preferred to employ temperatures from 70 to 150° C., preferably from 80 to 120° C., and with particular preference from 85 to 110° C. The process of preparing the polymer may be conducted at a pressure less than, equal to or greater than 1 bar (absolute), so that the polymerization temperature may exceed the boiling temperature of the liquid medium and may be up to 200° C. In general, when using a liquid medium having a boiling temperature of ≦100° C. at 1 bar (absolute) or when using volatile monomers such as ethylene, butadiene or vinyl chloride, polymerization is carried out under superatmospheric pressure. In this case the pressure may be 1.2, 1.5, 2, 5, 10, 15 bar or higher. If the process of the invention is conducted under subatmospheric pressure, then pressures of 950 mbar, frequently 900 mbar and often 850 mbar (absolute) are established. It is advantageous to conduct the polymer preparation under an inert gas atmosphere, such as under nitrogen or argon, for example.

In the course of the polymerization it is also possible to use regulators by means of which the molecular mass of the polymer is reduced. Suitable examples are compounds containing a thiol group, such as tert-butyl mercaptan, thioglycolic acid, mercaptoethanol, mercaptopropyltrimethoxysilane, or tert-dodecyl mercaptan. The proportion of these regulators may in particular be up to 0.3% by weight, preferably from 0.02 to 0.2% by weight, based in each case on the overall amount of the ethylenically unsaturated monomers used for the polymerization.

In emulsion and suspension polymerization processes it is also possible to use dispersants which keep both the polymer particles and the monomer droplets in disperse distribution in the liquid medium. Suitable such dispersants include in principle both protective colloids and emulsifiers.

Examples of suitable protective colloids are polyvinyl alcohols, cellulose derivatives, or vinylpyrrolidone copolymers. A detailed description of further suitable protective colloids is given in Houben-Weyl, Methoden der organischen Chemie [Methods of organic chemistry], Volume XIV/1, Makromolekulare Stoffe [Macromolecular substances], Georg-Thieme-Verlag, Stuttgart, 1961, pages 411 to 420.

As dispersants it is also possible to use emulsifiers, whose relative molecular weights, unlike those of the protective colloids, are usually below 1000 g/mol. They may be anionic, cationic or nonionic in nature. In the case where mixtures of surface-active substances are used, the individual components must of course be compatible with one another, which in case of doubt can be checked by means of a few tests beforehand. In general, anionic emulsifiers are compatible with one another and with nonionic emulsifiers. The same applies to cationic emulsifiers, whereas anionic and cationic emulsifiers are usually not compatible with one another. Examples of emulsifiers commonly used are ethoxylated mono-, di- and trialkylphenols (EO units: 3 to 50, alkyl: $C_4$ to $C_{12}$), ethoxylated fatty alcohols (EO units: 3 to 50; alkyl: $C_8$ to $C_{36}$) and also alkali metal salts and ammonium salts of alkyl sulfates (alkyl: $C_8$ to $C_{12}$), of sulfuric monoesters with ethoxylated alkanols (EO units: 4 to 30, alkyl: $C_{12}$ to $C_{18}$) and with ethoxylated alkylphenols (EO units: 3 to 50, alkyl: $C_4$ to $C_{12}$), of alkylsulfonic acids (alkyl: $C_{12}$ to $C_{18}$) and of alkylarylsulfonic acids (alkyl: $C_9$ to $C_{18}$). Further suitable emulsifiers may be found in Houben-Weyl, op. cit., pages 192 to 208.

Compounds which have additionally proven themselves as surface-active substances are those of the formula I

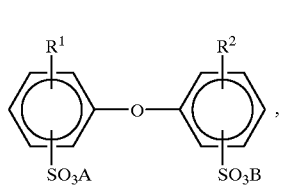

(I)

where $R^1$ and $R^2$ are hydrogens or $C_4$- to $C_{24}$-alkyl but are not both simultaneously hydrogens, and A and B may be alkali metal ions and/or ammonium ions. In the formula I, $R^1$ and $R^2$ are preferably linear or branched alkyl radicals having 6 to 18 carbon atoms, especially 6, 12 or 16 carbon atoms, or —H, but are not both simultaneously hydrogens. A and B are preferably sodium, potassium or ammonium, particular preference being given to sodium. Particularly advantageous compounds I are those where A and B are sodium, $R^1$ is a branched alkyl radical of 12 carbon atoms, and $R^2$ is hydrogen or $R^1$. Use is frequently made of technical-grade mixtures with a from 50 to 90% by weight fraction of the monoalkylated product, an example being Dowfax® 2A1 (trademark of Dow Chemical Company). The compounds I are common knowledge, from U.S. Pat. No. 4,269,749, for example, and are obtainable commercially.

It is of course also possible to use mixtures of emulsifiers and protective colloids as dispersants.

If a dispersant is used in an emulsion or suspension polymerization process to prepare the polymer, the amount is generally from 0.1 to 3% by weight, based on the monomers for free-radical polymerization.

It is possible to include the totality of the dispersant in the initial charge to the polymerization vessel. An alternative option is to include none, or only a portion, of the dispersant in the initial charge and to add it all, or the remaining portion, continuously or discontinuously, in the course of the polymerization.

The polymer forming the basis of the pressure sensitive adhesive is prepared preferably by means of free-radically initiated aqueous emulsion polymerization.

To prepare the homopolymers or copolymers forming the polymer by aqueous emulsion polymerization, esters of vinyl alcohol and monocarboxylic acids having 1 to 18 carbon atoms, such as vinyl acetate, vinyl propionate, vinyl n-butyrate, vinyl laurate and vinyl stearate, esters of preferably $C_3$ to $C_6$ $\alpha,\beta$-monoethylenically unsaturated mono- and dicarboxylic acids, such as especially acrylic acid, methacrylic acid, maleic acid, fumaric acid, and itaconic acid, with generally $C_1$ to $C_{12}$, preferably $C_1$ to $C_8$, and in particular $C_1$ to $C_4$ alkanols, such as especially methyl, ethyl, n-butyl, isobutyl and 2-ethylhexyl acrylate and methacrylate, dimethyl maleate and di-n-butyl maleate, and nitriles of $\alpha,\beta$-monoethylenically unsaturated carboxylic acids, such as acrylonitrile are highly suitable. Particularly suitable are esters of preferably $C_3$ to $C_6$ $\alpha,\beta$-monoethylenically unsaturated monocarboxylic and dicarboxylic acids, such as especially acrylic acid, methacrylic acid, maleic acid, fumaric acid and itaconic acid, with generally $C_1$ to $C_{12}$, preferably $C_1$ to $C_8$, and especially $C_1$ to $C_4$ alkanols, such as especially methyl, ethyl, n-butyl, isobutyl and 2-ethylhexyl acrylate and methacrylate, dimethyl maleate and di-n-butyl maleate, for preparing the homopolymers or copolymers which form the polymer. Preference for preparing the polymer is given to the use as principal monomers of alkyl acrylates and/or alkyl methacrylates, such as n-butyl acrylate, methyl methacrylate and/or 2-ethylhexyl acrylate. In particular, the polymer is prepared using monomer mixtures having the following composition:

from 50 to 60% by weight of n-butyl acrylate,
from 20 to 30% by weight of 2-ethylhexyl acrylate,
from 10 to 20% by weight of methyl methacrylate, and
from 0 to 5% by weight of acrylic or methacrylic acid,
the figures in % by weight being based on the overall amount of the monomers used for the polymerization.

It is essential to the invention that the polymer has a glass transition temperature $T_g \leq 10°$ C. Use is frequently made of polymers whose $T_g$ values are $\leq 0°$ C., $\leq -10°$ C., $\leq -20°$ C., $\leq -30°$ C., $\leq -40°$ C. or $\leq -50°$ C. It is, however, also possible to use polymers whose glass transition temperatures are from $-60$ to $\leq 10°$ C., from $-50$ to $-10°$ C., of from $-40$ to $-20°$ C. The glass transition temperature here is the midpoint temperature in accordance with ASTM D 3418-82, determined by means of differential thermal analysis (DSC) [cf. also Ullmann's Encyclopedia of Industrial Chemistry, page 169, VCH, Weinheim, (1992) and Zosel in Farbe und Lack 82 (1976), pages 125 to 134].

According to Fox (T. G. Fox, Bull. Am. Phys. Soc. 1956 [Ser. II] 1, page 123 and Ullmann's Encyclopädie der technischen Chemie, Vol. 19, page 18, 4th edition, VCH, Weinheim, (1980)), the glass transition temperature of copolymers with slight crosslinking at most is given in approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures, in degrees Kelvin, of the polymers composed in each case of only one of the monomers 1, 2, . . . n. The glass transition temperatures of these homopolymers of the majority of ethylenically unsaturated monomers are known (or may be determined experimentally in a simple and conventional manner) and are listed, for example, in J. Brandrup, E. H. Immergut, Polymer Handbook $1^{st}$ Ed. J. Wiley, New York, 1966, $2^{nd}$ Ed. J. Wiley, New York, 1975 and $3^{rd}$ Ed. J. Wiley, New York, 1989, and in Ullmann's Encyclopedia of Industrial Chemistry, Vol. A 21, page 169, VCH, Weinheim (1992).

The polymers are used preferably in the form of an aqueous dispersion. It is significant that these aqueous dispersions have an heightened stability. In other words, aqueous dispersions of polymers formed from monomers in the presence of one of the abovementioned oligomeric compounds are markedly more stable than those whose polymers have been prepared from the corresponding monomers in the absence of an oligomeric compound. This is manifested, for example, in a heightened shear stability and/or in a lower amount of necessary dispersant.

For use as a pressure sensitive adhesive, a tackifier, i.e., a tackifying resin, is preferably added to the polymers or to the aqueous dispersion of the polymer. Tackifiers are known, for example, from Adhesives Age, July 1987, pages 19 to 23 or Polym. Mater. Sci. Eng. 61 (1989), pages 588 to 592.

Examples of tackifiers are natural resins, such as rosins and their derivatives formed by disproportionation or isomerization, polymerization, dimerization, or hydrogenation. They may be present in their salt form (with, for example, monovalent or polyvalent counterions [cations]) or, preferably, in their esterified form. Alcohols used for the esterification may be monohydric or polyhydric. Examples are methanol, ethanediol, diethylene glycol, triethylene glycol, 1,2,3-propanetriol (glycerol), and pentaerythritol.

Also used, furthermore, are hydrocarbon resins, examples being coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, $\alpha$-methylstyrene or vinyltoluenes.

Further tackifiers, which are being used increasingly, include polyacrylates of low molecular weight. These polyacrylates preferably have a weight-average molecular weight of less than 30,000 g/mol. The polyacrylates consist preferably of at least 60% by weight, in particular at least 80% by weight, of $C_1$–$C_8$ alkyl acrylates or methacrylates.

Preferred tackifiers are natural or chemically modified rosins. Rosins consist predominantly of abietic acid or its derivatives.

The tackifiers may be added in a simple manner to the polymers for use in accordance with the invention, preferably to the aqueous dispersions of these polymers. The tackifiers are themselves preferably in the form of an aqueous dispersion.

The amount of the tackifiers is preferably from 5 to 100% by weight, in particular from 10 to 50% by weight, based in each case on the overall amount of the polymer (solids/solids).

In addition to tackifiers it is of course also possible to use other additives as well, examples being thickeners, defoamers, plasticizers, pigments, wetting agents, and fillers, in formulating pressure sensitive adhesives.

The polymers or their aqueous dispersions may be applied by customary methods, such as by rolling, knife coating, brushing, etc., to substrates, such as paper or polymer tapes and films, for example, preferably comprising polyethylene, polypropylene, which may have been biaxially or monoaxially oriented, polyethylene terephthalate, polyvinyl chloride, polystyrene, polyamide, or metal surfaces. The water may be removed in a simple manner by drying at from 50 to 150° C. For subsequent use, the PSA-coated side of the substrates, for example, of the labels or tapes, may be lined with a release paper, for example, with a siliconized paper.

The pressure sensitive adhesives of the invention display a balanced proportion between effective adhesion and high cohesion.

EXAMPLES

1. Preparation of a Cobalt Oxime Boron Fluoride Complex

The cobalt oxime boron fluoride complex was prepared in accordance with the procedure described by Bacac and Espenson in J. Am. Chem. Soc. 1984 (106) pages 5197 to 5202.

For this purpose, 2.00 g of cobalt(II) acetate tetrahydrate, 1.90 g of dimethyl glyoxime, 10 ml of boron trifluoride diethyl etherate and 150 ml of diethyl ether were charged under nitrogen to a 250 ml two-necked flask and stirred at 20° C. for 6 hours. The precipitated solid was subsequently filtered off under nitrogen and washed with 20 ml of deionized water which had a temperature of 1° C. The solids were dried under reduced pressure and then analyzed spectroscopically. The presence of an organocobalt compound of structure II below was confirmed:

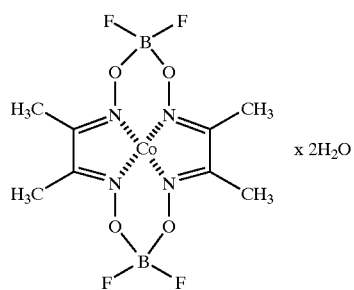

(II)

2. Preparation of an Oligomeric Polymethacrylic Acid

A three-necked flask was charged under nitrogen with 17.5 mg of the cobalt oxime boron fluoride complex II described in Section 1., 0.75 g of VA 044® [trademark of WAKO, 2,2'-azobis(N,N'-dimethyleneisobutyramidine) dihydrochloride] in 450 g of deionized water and the solution obtained was heated to 55° C. At this temperature, a solution prepared from 190 g of methacrylic acid and 9 mg of the cobalt complex II was metered into the stirred solution over the course of 1 hour. Subsequently, the solution was stirred at 55° C. for another 1.5 hours and then cooled to room temperature. The solution had a solids content of 26.9% by weight, based on the overall weight of the solution. The number-average molecular weight $M_n$ of the oligomeric compound was found to be 3000 g/mol and the polydispersity index D to be 2.2 by gel permeation chromatography (columns: 1×TSK PW-XL 5000, 1×Waters Ultrahydrogel 1000 and 2×Waters Hydrogel 500, length each 30 cm, diameter each 7.8 mm, temperature: 35° C., flow rate 0.5 ml/min, eluent: deionized water containing 0.08 M TRIS buffer pH=7.0, 0.15 M NaCl and 0.01 M $NaN_3$). An ethylenically unsaturated double bond content of >90 mol % was found by means of NMR spectroscopy.

3. Preparation of a Polymer by Free-Radically Initiated Aqueous Emulsion Polymerization A 1 l four-necked flask equipped with an anchor stirrer, reflux condenser and two metering devices was charged under nitrogen with 150 g of deionized water and 1.7 g of an aqueous polystyrene seed (solids content 33% by weight, number-average particle diameter 32 nm) and this initial charge was heated with stirring to 95° C.

Feed Stream 1:

| |
|---|
| 207.1 g of deionized water |
| 12.44 g of a 45% strength by weight aqueous solution of Dowfax ® 2A1 (trademark of Dow Chemical Company) |
| 3.73 g of a 30% strength by weight aqueous solution of Disponil ® FES 77 (trademark of Henkel KGaA) |
| 0.28 g of tert-dodecyl mercaptan |
| 5.6 g of acrylic acid |
| 315.8 g of n-butyl acrylate |
| 154.0 g of 2-ethylhexyl acrylate |
| 84.0 g of methyl methacrylate |
| 2.08 g of the oligomeric polymethacrylic acid solution prepared in Section 2. |

Feed Stream 2:

| |
|---|
| 40.0 g of a 7% strength by weight aqueous solution of sodium peroxodisulfate |

To the initial charge, stirred at 95° C., there were added 4.0 g of feed stream 2. After 5 minutes, feed stream 1 and the remainder of feed stream 2 were metered continuously into the initial charge, stirred at 95° C., via the two metering units, metered addition beginning simultaneously and taking place continuously over the course of 3 hours. Subsequently, the resultant aqueous polymer dispersion was stirred at reaction temperature for another 30 minutes. Thereafter, at a reaction temperature of 95° C., 16.8 g of a 10% strength by weight aqueous solution of tert-butyl hydroperoxide and 14.9 g of a 12% strength by weight aqueous solution of acetone bisulfite (=adduct of sodium bisulfite and acetone) were metered into the reaction mixture via the two metering units, metered addition beginning simultaneously and taking place continuously over the course of 30 minutes. After the end of the postpolymerization, 19.6 g of a 10% strength by weight aqueous solution of sodium hydroxide were added to the stirred aqueous polymer dispersion, and it was cooled to room temperature. The aqueous dispersion had a solids content of 56% by weight, based on the overall weight of the aqueous dispersion.

The solids content was determined in general terms by drying an aliquot to constant weight at 115° C. under an IR lamp having an output of 140 watts.

The glass transition temperatures were determined in general terms using a Toledo instrument from Mettler in accordance with ASTM D 3418-82. In the above example, the $T_g$ was −32.5° C.

4. Preparation of a Polymer by Free-Radically Initiated Aqueous Emulsion Polymerization A 1 l four-necked flask equipped with an anchor stirrer, reflux condenser and two metering devices was charged under nitrogen with 150 g of deionized water and 1.7 g of an aqueous polystyrene seed (solids content 33% by weight, number-average particle diameter 32 nm) and this initial charge was heated with stirring to 95° C.

Feed Stream 1:

| |
|---|
| 206.1 g of deionized water |
| 12.44 g of a 45% strength by weight aqueous solution of Dowfax ® 2A1 |
| 3.73 g of a 30% strength by weight aqueous solution of Disponil ® FES 77 |
| 0.28 g of tert-dodecyl mercaptan |
| 5.6 g of acrylic acid |
| 315.8 g of n-butyl acrylate |
| 154.0 g of 2-ethylhexyl acrylate |
| 84.0 g of methyl methacrylate |
| 4.16 g of the oligomeric polymethacrylic acid solution prepared in Section 2. |

Feed Stream 2:

| |
|---|
| 40.0 g of a 7% strength by weight aqueous solution of sodium peroxodisulfate |

To the initial charge, stirred at 95° C., there were added 4.0 g of feed stream 2. After 5 minutes, feed stream 1 and the remainder of feed stream 2 were metered continuously into the initial charge, stirred at 95° C., via the two metering units, metered addition beginning simultaneously and taking place continuously over the course of 3 hours. Subsequently, the resultant aqueous polymer dispersion was stirred at reaction temperature for another 30 minutes. Thereafter, at a reaction temperature of 95° C., 16.8 g of a 10% strength by weight aqueous solution of tert-butyl hydroperoxide and 14.9 g of a 12% strength by weight aqueous solution of acetone bisulfite were metered into the reaction mixture via the two metering units, metered addition beginning simultaneously and taking place continuously over the course of 30 minutes. After the end of the postpolymerization, 19.6 g of a 10% strength by weight aqueous solution of sodium hydroxide were added to the stirred aqueous polymer dispersion, and it was cooled to room temperature. The aqueous dispersion had a solids content of 56% by weight, based on the overall weight of the aqueous dispersion. The glass transition temperature of the polymer was −32.5° C.

5. Preparation of a Polymer by Free-Radically Initiated Aqueous Emulsion Polymerization A 1 l four-necked flask equipped with an anchor stirrer, reflux condenser and two metering devices was charged under nitrogen with 150 g of deionized water and 1.7 g of an aqueous polystyrene seed (solids content 33% by weight, number-average particle diameter 32 nm) and this initial charge was heated with stirring to 95° C.

Feed Stream 1:

| |
|---|
| 204.2 g of deionized water |
| 12.44 g of a 45% strength by weight aqueous solution of Dowfax ® 2A1 |
| 3.73 g of a 30% strength by weight aqueous solution of Disponil ® FES 77 |
| 0.28 g of tert-dodecyl mercaptan |
| 5.6 g of acrylic acid |
| 314.7 g of n-butyl acrylate |
| 154.0 g of 2-ethylhexyl acrylate |
| 84.0 g of methyl methacrylate |
| 6.25 g of the oligomeric polymethacrylic acid solution prepared in Section 2. |

Feed Stream 2:

| |
|---|
| 40.0 g of a 7% strength by weight aqueous solution of sodium peroxodisulfate |

To the initial charge, stirred at 95° C., there were added 4.0 g of feed stream 2. After 5 minutes, feed stream 1 and the remainder of feed stream 2 were metered continuously into the initial charge, stirred at 95° C., via the two metering units, metered addition beginning simultaneously and taking place continuously over the course of 3 hours. Subsequently, the resultant aqueous polymer dispersion was stirred at reaction temperature for another 30 minutes. Thereafter, at a reaction temperature of 95° C., 16.8 g of a 10% strength by weight aqueous solution of tert-butyl hydroperoxide and 14.9 g of a 12% strength by weight aqueous solution of acetone bisulfite were metered into the reaction mixture via the two metering units, metered addition beginning simultaneously and taking place continuously over the course of 30 minutes. After the end of the postpolymerization, 19.6 g of a 10% strength by weight aqueous solution of sodium hydroxide were added to the stirred aqueous polymer dispersion, and it was cooled to room temperature. The aqueous dispersion had a solids content of 56% by weight, based on the overall weight of the aqueous dispersion. The glass transition temperature of the polymer was −32.0° C.

6. Comparative Example

Example 3 was repeated except that no oligomeric polymethacrylic acid was used. This gave an aqueous polymer dispersion having a solids content of 56% by weight. The glass transition temperature of the polymer was 33° C.

7. Performance Investigations

The polymers of the aqueous polymer dispersions prepared in Examples 3 to 6 were performance-tested for their pressure sensitive adhesive properties. The procedure adopted was as follows:

a) Preparing the test strips

The aqueous polymer dispersion for testing was examined without the addition of tackifiers. The aqueous polymer dispersion was applied using a coating bar in a thin layer to a commercial polyester film (Hostaphan film RN 36) and dried in a drying oven at 90° C. for 3 minutes. The gap height of the coating bar was chosen so as to give an application of from 29 to 31 g/m$^2$ for the dried polymer (pressure sensitive adhesive). Siliconized paper was placed onto the dried polymer and rolled on firmly using a manual roller. The film laminate produced in this way was cut into strips 25 cm long and 2.5 cm wide. Prior to testing, these strips were stored for at least 24 hours at 23° C. and 50% relative atmospheric humidity.

b) Testing of the shear strength (in accordance with FINAT FTM 7)

After the siliconized paper had been removed, the respective test strip was bonded to the edge of a stainless steel test panel so as to give a bond area of 1.56 cm$^2$. 10 minutes after bonding, a 500 g weight was fastened to the projecting end of the film and the metal test panel was suspended vertically in a chamber having a constant temperature of 23° C. and a relative atmospheric humidity of 50%. The time taken for the bond to break under the influence of the weight is a measure of the shear strength, which is in turn a measure of the cohesion. The longer the period of time until the bond breaks, the greater the cohesion. Three independent determinations were conducted for each polymer. The figures reported in Table 1 are mean values from these three determinations.

c) Testing of the peel strength (in accordance with FINAT FTM 1)

After the siliconized paper had been removed, a test strip was bonded to a stainless steel test panel at 23° C. and 50% relative atmospheric humidity.

Following the expiry of a predetermined contact time of 1 minute or 24 hours, respectively, the strip was peeled from the test panel at an angle of 180° and a speed of 300 mm per minute using a tensile testing machine. The force required to do this is a measure of the adhesion. It is designated as peel strength and reported in Newton per 2.5 cm (N/2.5 cm). The higher the peel strength value after the stated time, the higher the adhesion. Three independent determinations were carried out for each polymer. The figures reported in Table 1 are mean values of these three determinations.

TABLE 1

Summary of the shear strength and peel strength of the polymers obtained from the aqueous polymer dispersions of Examples 3 to 6

| Polymer from | Shear strength | Peel strength in N/2.5 cm | |
|---|---|---|---|
| Example | in minutes | after 1 minute | after 24 hours |
| 3 | 2195 | 6.9 | 10.6 |
| 4 | 3666 | 6.2 | 10.8 |
| 5 | 2306 | 5.7 | 10.7 |
| 6 (comparative) | 432 | 6.8 | 10.9 |

As is clearly evident from Table 1, the pressure sensitive adhesives of the invention in comparison to a pressure sensitive adhesive prepared using no oligermic compound have markedly higher shear strengths (cohesion) with a peel strength (adhesion) which remains the same.

We claim:

1. A pressure sensitive adhesive based on a polymer having a glass transition temperature <10° C. and obtained by free-radically initiated polymerization of an ethylenically unsaturated monomer or a mixture of ethylenically unsaturated monomers in a liquid medium in the presence of >0 and <5 parts by weight of at least one oligomeric compound based on 100 parts by weight of the ethylenically unsaturated monomer or the mixture of ethylenically unsaturated monomers used for the polymerization;

wherein said oligomer compound is itself obtained by free-radically initiated polymerization of ethylenically unsaturated monomers and has
   a) an ethylenically unsaturated double bond content of at least 50 mol % as determined by NMR-spectroscopy; and
   b) a number-average unsaturated molecular weight of from 500 to 50,000 g/mol.

2. An adhesive as claimed in claim 1, wherein the oligomeric compound has an ethylenically unsaturated double bond content of at least 70 mol %.

3. An adhesive as claimed in either of claim 1, wherein the ethylenically unsaturated double bonds are in the form of vinylidene groups of the formula

>C=CH$_2$.

4. An adhesive as claimed in claim 1, wherein the oligomeric compound comprises acid groups.

5. An adhesive as claimed in claim 1, wherein the oligomeric compound is composed in copolymerized form of at least 50% by weight of ethylenically unsaturated monomers containing acid groups.

6. An adhesive as claimed in claim 1, wherein the oligomeric compound has a number-average molecular weight of from 1000 to 30,000 g/mol.

7. An adhesive as claimed in claim 1, wherein the oligomeric compound has a number-average molecular weight of from 1500 to 20,000 g/mol.

8. An adhesive as claimed in claim 1, wherein the oligomeric compound has a number-average molecular weight of from 2000 to 10,000 g/mol.

9. An adhesive as claimed in claim 1, wherein the polymer is obtained by free-radically initiated polymerization of an ethylenically unsaturated monomer or a mixture of ethylenically unsaturated monomers in the presence of from 0.02 to 3 parts by weight of the oligomeric compound, based on 100 parts by weight of ethylenically unsaturated monomer or the mixture of ethylenically unsaturated monomers used for the polymerization.

10. An adhesive as claimed in claim 1, wherein the polymer is obtained by free-radically initiated polymerization of an ethylenically unsaturated monomer or a mixture of ethylenically unsaturated monomers in the presence of from 0.05 to 2 parts by weight of the oligomeric compound, based on 100 parts by weight of ethylenically unsaturated monomer or the mixture of ethylenically unsaturated monomers used for the polymerization.

11. An adhesive as claimed in claim 1, wherein the polymer is obtained by free-radically initiated polymerization of an ethylenically unsaturated monomer or a mixture of ethylenically unsaturated monomers in the presence of from 0.07 to 1.5 parts by weight of the oligomeric compound, based on 100 parts by weight of ethylenically unsaturated monomer or the mixture of ethylenically unsaturated monomers used for the polymerization.

12. An adhesive as claimed in claim 1, wherein the polymer is prepared by free-radically initiated aqueous emulsion polymerization.

13. An adhesive as claimed in claim 1, further comprising a tackifying resin.

14. A substrate coated with an adhesive as claimed in claim 1.

15. A tape coated with an adhesive as claimed in claim 1.

16. A label coated with an adhesive as claimed in claim 1.

17. The use of a polymer as claimed in claim 1 as a pressure sensitive adhesive.

18. The adhesive according to claim 1, wherein said polymer is prepared using a monomer mixture having following composition:

from 50 to 60% by weight of n-butyl acrylate;
   from 20 to 30% by weight of 2-ethylhexyl acrylate;
   from 10 to 20% by weight of methyl methacrylate; and
   from 0 to 5% by weight of acrylic or methacrylic acid;
   based on the total amount of monomers used for the polymerization.

* * * * *